(12) United States Patent
Stone

(10) Patent No.: US 12,415,619 B2
(45) Date of Patent: Sep. 16, 2025

(54) METROLOGICAL INSPECTION SYSTEM FOR AIRCRAFT

(71) Applicant: Twin Coast Metrology, Inc., Fort Worth, TX (US)

(72) Inventor: Eric James Stone, Fort Worth, TX (US)

(73) Assignee: Twin Coast Metrology, Inc., Forth Worth, TX (US)

( * ) Notice: Subject to any disclaimer, the term of this patent is extended or adjusted under 35 U.S.C. 154(b) by 445 days.

(21) Appl. No.: 18/074,247

(22) Filed: Dec. 2, 2022

(65) Prior Publication Data
US 2023/0174250 A1 Jun. 8, 2023

Related U.S. Application Data

(60) Provisional application No. 63/285,331, filed on Dec. 2, 2021.

(51) Int. Cl.
*B64F 5/60* (2017.01)
*G06T 7/00* (2017.01)
(Continued)

(52) U.S. Cl.
CPC .............. *B64F 5/60* (2017.01); *G06T 7/0004* (2013.01); *G06V 10/141* (2022.01);
(Continued)

(58) Field of Classification Search
CPC .................... B64F 5/60; G06T 7/0004; G06T 2207/30252; G06T 2207/30164
See application file for complete search history.

(56) References Cited

U.S. PATENT DOCUMENTS 4,896,278 A * 1/1990 Grove ................. G01N 29/265
73/598
6,064,759 A 5/2000 Buckley
(Continued)

FOREIGN PATENT DOCUMENTS

CN 102439394 A 5/2012
CN 107091610 B 5/2019
(Continued)

OTHER PUBLICATIONS

Lafiosca P, Fan IS, Avdelidis NP. Automated Aircraft Dent Inspection via a Modified Fourier Transform Profilometry Algorithm. Sensors (Basel). Jan. 7, 2022;22(2):433. doi: 10.3390/s22020433. PMID: 35062394; PMCID: PMC8779778. (Year: 2022).*
(Continued)

*Primary Examiner* — Michael Robert Cammarata
(74) *Attorney, Agent, or Firm* — Blueshift IP; Robert Plotkin

(57) ABSTRACT

A method and system for inspecting an aircraft for defects. The system comprises a plurality of cameras and projectors mounted on a structural inspection frame for imaging substantially the entire exterior surface of the aircraft. The projectors can project structured light patterns onto an exterior surface of the aircraft so that the camera system can capture a three-dimensional map of the exterior surface of the aircraft. Image processing systems can compare the captured three-dimensional map with an approved reference model of the aircraft to determine if there are defects or damage to the surface of the aircraft. The system may be configured for use with a particular aircraft model or a plurality of aircraft models. If exterior defects or damage is found, the system can project reference patterns or data onto the surface of the aircraft to aid in visual inspection of the potentially damaged portions of the aircraft.

13 Claims, 7 Drawing Sheets

(51) Int. Cl.
*G06V 10/141* (2022.01)
*G06V 10/145* (2022.01)
*G06V 10/60* (2022.01)

(52) U.S. Cl.
CPC ............ *G06V 10/145* (2022.01); *G06V 10/60* (2022.01); *G06T 2207/10152* (2013.01); *G06T 2207/30252* (2013.01)

(56) References Cited

U.S. PATENT DOCUMENTS

| | | | |
|---|---|---|---|
| 6,639,660 B1 * | 10/2003 | Beck | G02B 27/20 356/237.2 |
| 7,193,696 B2 * | 3/2007 | Engelbart | B29C 70/384 356/237.1 |
| 7,372,558 B2 * | 5/2008 | Kaufman | G01B 11/2513 356/601 |
| 7,480,037 B2 * | 1/2009 | Palmateer | G03B 29/00 356/237.1 |
| 7,961,912 B2 | 6/2011 | Stevick | |
| 8,982,207 B2 * | 3/2015 | Jang | B64F 5/60 901/44 |
| 9,052,294 B2 * | 6/2015 | Walton | G01N 21/8806 |
| 9,255,909 B2 * | 2/2016 | Kollgaard | G01N 29/069 |
| 9,272,794 B2 | 3/2016 | Froom | |
| 9,645,012 B2 * | 5/2017 | Marsh | G01J 5/026 |
| 10,434,555 B2 * | 10/2019 | Gross | G01B 21/20 |
| 10,643,329 B2 * | 5/2020 | Afrasiabi | G06T 7/97 |
| 12,306,638 B2 * | 5/2025 | Fetzer | B25J 9/1697 |
| 12,319,327 B2 * | 6/2025 | Brick | G05B 23/0283 |
| 2005/0121422 A1 | 6/2005 | Morden | B25H 7/00 700/95 |
| 2005/0225753 A1 * | 10/2005 | Engelbart | G05B 19/418 356/237.1 |
| 2013/0336575 A1 * | 12/2013 | Dalla-Torre | G06T 7/001 382/149 |
| 2014/0063230 A1 * | 3/2014 | Remillard | G01C 11/06 348/94 |
| 2014/0132729 A1 | 5/2014 | Foulk | |
| 2016/0212411 A1 * | 7/2016 | Lindner | G06T 7/593 |
| 2017/0052070 A1 * | 2/2017 | Marsh | G06V 20/20 |
| 2018/0005362 A1 * | 1/2018 | Wang | G06V 10/993 |
| 2018/0276810 A1 * | 9/2018 | Wang | G01M 5/0033 |
| 2020/0372625 A1 | 11/2020 | Dal Mutto | |
| 2021/0304390 A1 * | 9/2021 | Lowry | H04N 23/63 |
| 2022/0024577 A1 * | 1/2022 | Stamatovski | B64F 3/00 |
| 2023/0342909 A1 * | 10/2023 | Hyatt | G06V 10/25 |
| 2023/0419471 A1 * | 12/2023 | Schleith | H04N 23/56 |

FOREIGN PATENT DOCUMENTS

| | | | | |
|---|---|---|---|---|
| CN | 111429565 B | | 4/2021 | |
| CN | 112884733 A | | 6/2021 | |
| CN | 113335557 A | * | 9/2021 | ............... B64F 5/60 |
| FR | 3036101 | | 11/2016 | |
| NL | 2025866 B1 | * | 2/2022 | ............ B64U 10/13 |
| WO | 2000050304 | | 8/2000 | |
| WO | WO-2017098071 A1 | * | 6/2017 | .......... G01C 11/025 |
| WO | 2021014514 | | 1/2021 | |
| WO | 2021140259 | | 7/2021 | |

OTHER PUBLICATIONS

J. Li, J. Berglund, F. Auris, A. Hanna, J. Vallhagen and K. Åkesson, "Evaluation of Photogrammetry for Use in Industrial Production Systems," 2018 IEEE 14th International Conference on Automation Science and Engineering (CASE), Munich, Germany, 2018, pp. 414-420, doi: 10.1109/COASE.2018.8560496 (Year: 2018).*
English translation of Aguilar WO 2017098071.*

* cited by examiner

METROLOGICAL INSPECTION SYSTEM FOR AIRCRAFT

CROSS-REFERENCE TO RELATED APPLICATION

This application claims the benefit of U.S. Provisional Patent Application No. 63/285,331, filed Dec. 2, 2021, which is incorporated by reference herein in its entirety.

TECHNICAL FIELD

The present invention relates to metrology, and more specifically to using optical metrology to inspect an aircraft or other large vehicles for surface imperfections, deviations, or damage.

BACKGROUND

The "background" description provided herein is for the purpose: of generally presenting the context of the disclosure. Work of the presently named inventors, to the extent it is described in the background section, as well as aspects of the description which may not otherwise qualify as prior art at the time of filing, are neither expressly nor impliedly admitted as prior art against the present invention.

Certain aircraft surface contours and coatings are instrumental to the aircraft performance characteristics, such that degradation of the coating material, or dents, dings, scratches, divots, ripples, bubbles, or damage may degrade aircraft performance. As a result, it is highly desirable to avoid such damage and to inspect for such damage prior to flight. Some aircraft panels or coatings are very delicate and are sensitive to this kind of damage. As a result, an aircraft's surface must be inspected thoroughly before using the aircraft, in order to identify and repair any damage to the coatings or surface characteristics, including aircraft contours.

Such inspection typically is done manually by human operators who visually, inspect the surface. Such inspection is tedious, time-consuming, error-prone, and labor intensive, taking days or even weeks to complete.

One of the fastest methods of assessing the overall condition of an aircraft and its components is the general visual inspection (GVI). According to Mainblades.com, over 80 percent of inspections on large transport aircraft are visual. These ground visual inspections typically comprise a casual walk around to a detailed inspection. Detailed inspections can be extremely challenging and time-consuming. The Federal Aviation Administration (FAA) defines aircraft visual inspections as "the process of using the eye, alone or in conjunction with various aids, as the sensing mechanism from which judgments may be made about the condition of a unit to be inspected." The purpose is not only to obtain an overall assessment of the status of a structure, component, or system but also to enable timely damage assessment before it reaches a critical state. During the GVI, the inspection is usually performed within a touching distance, additional equipment such as ladders and cherry pickers may be required to enhance visual access to the top of the fuselage.

According to the FAA, visual inspection is an essential part of aircraft maintenance. The visual inspection process requires trained and experienced inspectors, using validated procedures and appropriate calibration standards with effective, well-maintained equipment in a well-managed maintenance environment. Even with these advantages, visual inspections are a time consuming and arduous process. In the event of a military conflict or evacuation process, it may be difficult to inspect the air worthiness each aircraft before it is returned to service. What is needed is an automated system, digital, and metrological system for aircraft inspection that allows the aircraft to be examined accurately and efficiently.

What is needed is an automated, optical system for quickly scanning aircraft or other vehicle surfaces for imperfections which may affect the vehicle's operation. Once an imperfection is detected; a system is needed for immediately highlighting those imperfections for proper inspection. It is an aim of the present disclosure to address these issues.

SUMMARY

In view of the above needs, an automated system and method for analyzing and inspecting an aircraft is an objective of the present invention. A system for examination of physical structures, vehicles, and aircraft can include an inspection frame. The inspection frame is capable of enveloping the entire physical structure of the aircraft. The inspection frame may have one or a plurality of adjustable lighting systems, each of which may be mounted on the inspection frame. Each such lighting system may, for example, include one or a plurality of light-emitting components, such as one or a plurality of physical lights, one or a plurality of projectors, or any combination thereof. The inspection frame may also include one or a plurality of camera systems, each of which may be adjustably positioned along the inspection frame to capture images of the aircraft and its component parts for automated inspection.

A further embodiment a system for inspecting an aircraft includes a plurality of cameras and projectors mounted on a structural frame for the purpose of imaging the entire, or substantially the entire, exterior surface of the aircraft. The system is constructed to enable the entire, or substantially the entire, exterior surface of the aircraft to be imaged while the system and the aircraft are fixed in place. For example, the system is constructed to enable the entire, or substantially the entire, exterior surface of the aircraft to be imaged while the light-emitting components (e.g., projectors) and/or cameras of the system are fixed in place. Software executing in the system creates a three-dimensional map of the entire, or substantially the entire, exterior surface of the aircraft based on the images captured by the plurality of cameras. The system may be configured for use with a particular aircraft, a particular model of aircraft, or a family of aircraft models. The system can also be reconfigured for use with a different aircraft model, model of aircraft, or family of aircraft.

A computer having an image processing system may be used for controlling the lighting systems, camera systems, and projection systems mounted on to the inspection frame. The computer controls and adjusts the lighting system (which may include, for example, one of a plurality of light-emitting components, such as one or a plurality of projectors). Under the control of the computer, the lighting system projects structured light patterns onto the physical surface of the aircraft. These structured light patterns may, for example, include grids, planes, fringes, hexagons, squares, and other geometric patterns, and the structuring of the light may be instantaneous or over time, e.g., by shifting the structured light and observing it at different time intervals.

The system may detect imperfections and anomalies in the surface of the aircraft by, for example, using the cameras of the system to capture reflections or dispersion of the projected structured light patterns from the surface of the aircraft, thereby generating a plurality of images of such reflections. A computer receives and stores the plurality of images. An image processing system executing on the computer generates, based on the plurality of images, a three-dimensional (3D) model of the aircraft, referred to herein as the "captured model" of the aircraft.

More specifically, because intrinsic and extrinsic parameters of the plurality of cameras are known (such as the three-dimensional coordinates of the plurality of cameras in space), the plurality of images may all be represented within a single coordinate system. Because of this, the image processing system may generate the 3D captured model of the aircraft without the need to stitch those images together, as is otherwise required in the prior art using stitching algorithms. Instead, the image processing system may assemble the plurality of images to generate the 3D captured model. Stored within the computer is a baseline model of the aircraft, which may, for example, be a CAD model of the aircraft as designed, a previously generated 3D captured model of the aircraft (generated using the invention herein), or any other model (e.g., a 3D model) of the aircraft that is known or believed to be free or substantially free of surface defects. The image processing system may compare the captured model of the aircraft to the baseline model of the aircraft to detect potential defects in the surface of the aircraft, such as potential damage and/or failures in the aircraft structure.

Because the system knows the structured light patterns that are projected on the surface of the aircraft, as well as the physical shape and contours of the aircraft, the system may use distortions in the structured light patterns to detect imperfections on the surface of the aircraft. The system may, for example, use any of a variety of techniques known in photogrammetry for detecting such imperfections. Once the image processing system has detected defects and tolerance failures on the surface of the aircraft, the projection system may assist an inspector by projecting lighting patterns and data onto the surface of the aircraft to aide in visually identifying these defects and tolerance failures. The projection system is controlled by the computer and in communication with the image processing system. This enables the projection system to project data and patterns on to the surface of the aircraft surface to pinpoint potential defects.

The image processing analysis may apply different fault tolerance criteria to different sections of the aircraft and/or to various parts or components of the aircraft. The image processing analysis may associate each of the captured images of the aircraft from the cameras with a corresponding region of the surface of the aircraft that corresponds with that image.

During the metrological analysis, various fault tolerance and analysis techniques are associated with the corresponding region of the aircraft component in the image being analyzed. Therefore, the inspection analysis may apply different defect detection crited a to different sections of the aircraft. The inspection analysis may apply different fault tolerances to various parts and/or components of the aircraft.

Each of the captured images may correspond to a corresponding region of the surface of the aircraft. Different ones of the captured images may correspond to different regions of the surface of the aircraft. Data and patterns can be used to highlight defects on the surface of the aircraft and are projected on to the corresponding regions of the aircraft that has those defects.

During calibration of the camera system, the lens model of the camera system may be mapped out in a three-dimensional (3D) imaging system. Each camera may have its own set of parameters, and different cameras may have different sets of parameters. In an embodiment, forty to-two hundred cameras may be used to inspect the aircraft. Each camera may have a unique identifier (e.g., serial number). These unique identifiers allow the system to know which camera captured which image and its position relative to the aircraft. Furthermore, the unique identifier further associates parameters associated with the camera, such as the distortion of the lens of particular camera. This may be represented, for example, by a polynomial centered at the center of the lens and curvature of the lens out to the edge of the lens.

The system may know where the lens sits relative to the imaging sensor. The image sensor may be represented by pixels. The pixel size may be specified by the image sensor specification. This allows the size of the sensor to be known. Information about the lens relative to the image sensor also allows the focal length of the lens to be known. This provides information as to how divergent an image is. The system may pick a focal length to cover the area that is collected by the camera. The principle point of the lens captures the shift of the camera lens relative to the sensor.

The system may know the roll, pitch, and yaw of the cameras relative to the aircraft surface. The camera image sensor may have a coordinate system. The coordinate system may determine the x, y, z plane of the camera sensor. The aircraft may be represented along the "z" axis. Each camera may be represented by a camera name associated with its position along the inspection frame. The camera name may be associated with an x, y, z, plane along with the camera's roll, pitch, and yaw. A four-by-four transformation matrix may be associated with where the camera sits in space. This coordinate system allows the images captured by the camera system to be represented by the same coordinate system as the cameras which took the image, so that they can be combined together without having to use an image stitching algorithm to combine the images.

The camera positions and/or other camera parameters may be calibrated prior to inspection. Alternatively, for example, such calibration may occur during inspection or after the inspection is complete. This may be accomplished by using a coordinate system landmark. The landmark can be a fixed object that is used by the camera system to determine if there is vibration, heat expansion, or other movement associated with the inspection frame and camera systems.

The structured light patterns may take any of a variety of forms, such as any of the forms known in the art of metrology, such as various colors and/or patterns. Sine patterns, colors, ramp patterns, spatial frequencies, coded dots, coded grids, etc. may, for example, be used by projectors to create structured lighting patterns. Multiple camera views may be used to triangulate data patterns on the surface.

The coordinate system used by embodiments of the present invention may be updated during the inspection. For example, once a landmark is known, the image sensor may be represented by a series of pixels. Based upon the where the landmark falls upon a pixel of the image sensor, the image processing can determine the depth of the image.

The projector locations on the inspection frame may be mapped so that they can be computer controlled. The projectors may be configured to project, for example, structured light, a harmonic scan, a time-shifted series of fringe, grid, color, or dot patterns, or other patterns of light.

After collection of the 3D surface data, the data processing analysis may include geometric analysis, Fourier analysis, Fast Fourier analysis, contour analysis, convex hull, concave hull, and/or convex/concave hull structured pattern to the surface of the aircraft. These analysis techniques may be used to compare the captured model of the aircraft to a baseline model of the aircraft to detect defects in the surface of the aircraft.

Of course, it will be appreciated that the present disclosure is not particularly limited to these effects, there may be others.

The foregoing paragraphs have been provided by way of general introduction and are not intended to limit the scope of the invention disclosed herein or the claims set forth herein. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
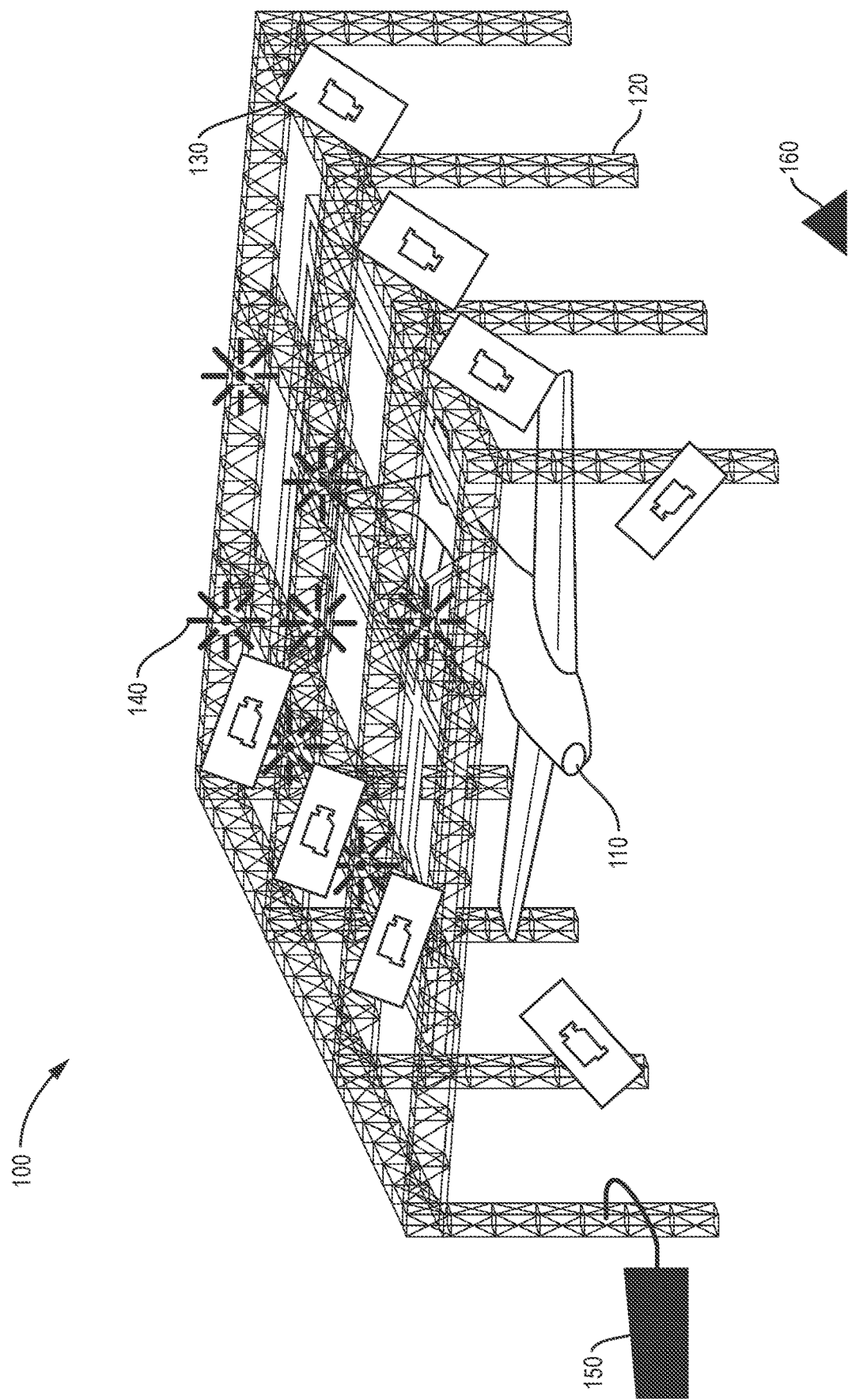
FIG. 1 illustrates an inspection frame with mounted lighting and camera sensor systems for inspecting an aircraft.

The figures are described in greater detail in the description and examples below, are provided for purposes of illustration only, and merely depict typical or example embodiments of the disclosure. The figures are not intended to be exhaustive or to limit the disclosure to the precise form disclosed. It should also be understood that the disclosure may be practiced with modification or alteration, and that the disclosure may be limited only by the claims and the equivalents thereof.

DETAILED DESCRIPTION

Embodiments of the present disclosure are directed to a system and method of using optical metrology to inspect an aircraft or other large vehicles for surface imperfections. The details of some exemplary embodiments of the systems, methods, and devices of the present disclosure are set forth in the description below. Other features, objects, and advantages of the disclosure will be apparent to one of skill in the art upon examination of the present description, figures, examples, and claims. It is intended that all such additional systems, methods; features, and advantages be included within this description, be within the scope of the present disclosure, and be protected by one or more of the accompanying claims.

Embodiments herein provide a method and system for analyzing and inspecting an aircraft is an objective of the present invention. The system relies upon an inspection frame, which is a physical structure that is large enough to envelope an entire aircraft. However, the system may be used to examine other physical structures, such as, but not limited to, vehicles, automobiles, watercraft, weapon systems, and the like within the inspection frame. As a result, any reference in this disclosure to an "aircraft" should be understood to apply equally to other physical structures. In an embodiment, the inspection frame has a plurality of mounted projection lighting systems. These projection lighting systems can include physical lights e.g., which emit unstructured light) and projectors (which may, for example, emit structured light). The inspection frame also includes a plurality of camera systems that are adjustably positioned along the inspection frame to capture images of the aircraft and its component parts for automated inspection.

A computer having an image processing system can be used for controlling the projection lighting systems and camera systems that are mounted on to the inspection frame. The computer controls and adjusts the lighting systems. Under the control of the computer, the lighting system projects structured light patterns on to the physical surface of the aircraft. These structured light patterns may, for example, include grids, planes, hexagons, squares, and other geometric patterns. Given the system knows the geometric patterns that are projected on the surface of the aircraft as well as the physical shape and contours of the aircraft, the system can use distortions in the structured light patterns to detect imperfections on the surface of the aircraft.

The system can detect imperfections and anomalies in the surface of the aircraft by capturing the reflected structured light patterns and wherein the camera systems collect one or more images of the structured light patterns projected on the aircraft. A computer receives and stores the one or more images collected by the camera systems. An image processing system executing on the computer can be utilized for analyzing, assembling, and processing the stored images captured by the cameras.

In an embodiment, the image processing system assembles the stored images to create a complete picture of the physical device for metrological analysis. Stored within the computer are physical parameters and fault tolerances for various types of aircraft. The image processing systems can compare a metrological analysis of the surface of a particular aircraft being inspected with the standard physical parameters and fault tolerances of the aircraft to detect potential damage and failures within the aircraft structure.

In a further embodiment, once the image processing system has detected defects and tolerance failures on the surface of the aircraft; the projectors can project data and patterns on to the surface of the aircraft surface to aide in visually pinpointing potential defects on the aircraft surface.

Referring now to the drawings, wherein like reference numerals designate identical or corresponding parts throughout the several views.

FIG. 1 provides an exemplary illustration of an aircraft inspection system 100 that utilizes an inspection frame 120 for inspecting an aircraft 110. The inspection frame 120 can be a structural facility that is large enough to encompass the entirety of an aircraft 110. In an embodiment, the inspection frame 120 may be support columns and braces of an aircraft 110 hanger. In another embodiment the inspection frame 120 can be stand-alone structure either housed in an aircraft hangar or standing outside as its own independent structure. In an exemplary embodiment, the inspection frame 120 is an independent structure that is housed within a controlled environment, like a large aircraft hangar. The controlled environment would allow ambient noise, light, and temperature to be controlled and minimized so that a more accurate inspection could occur.

The inspection frame's 120 support structure could be made of metal such as steel, aluminum, titanium, or alloys that are strong enough to create a super-structure that is large enough to encompass an entire aircraft 110 or other object for inspection. The inspection frame's 120 support structure may be made of any of a variety of materials, such as timber, engineered wood of sufficient strength to create the super-structure, and/or carbon fiber. The material may be selected, for example, based on its thermal, structural, weight, strength, or other mechanical properties.

In a further embodiment, the inspection frame 120 can include a plurality of cameras 130 that are mounted throughout its structure in order to capture images from every angle of the aircraft 110 being inspected. The plurality of cameras 130 can capture images along the upper, lower, left, right, front and back of the aircraft 110 being inspected such that a three-dimensional (3D) map of the aircraft 110 being inspected is created.

The cameras 130 mounted on the inspection frame 120 can include a plurality of digital still and video cameras 130 that with high resolution sensors. The cameras 130 can each be remotely and individually controlled by a computer 150. Each camera 130 has unique identifier such a serial number and name related to its position on the inspection frame 120. The unique identifier allows the computer 150 to communicate and control each individual camera 130 during the inspection process.

In a further embodiment, the inspection frame 120 includes a plurality of lighting projectors 140 that are mounted throughout its structure in order to illuminate all aspects of the aircraft 110 being inspected. The plurality of lighting projectors 140 can illuminate the upper, lower, left, right, front and back of the aircraft 110 being inspected such the entirety of the aircraft 110 can be seen.

In a further embodiment, the lighting projectors 140 can be a digital image projector with very lumen output up to 10,000 lumens or more with high contrast ratios, digital color adjustments, zoomable lenses, vertical and horizontal lens shift capabilities, low noise, and high resolution. The lighting projectors 140 can also comprise a digitally controllable high lumen led, MED, fluorescent, or incandescent light. These digitally controllable light can be used to eliminate shadows and highlight specific areas of the aircraft 110. In an embodiment, the lighting projectors 140 can include a combination of digital projectors and digitally controllable lights. The lighting projectors 140 can be remotely and individually controlled by the computer 150. Each lighting projector 140 has a unique identifier such a serial number and name related to its position on the inspection frame 120. The unique identifier allows the computer 150 to communicate and control each individual lighting projector 140 during the inspection process.

In a further embodiment, the aircraft 110 inspection system 100 that utilizes an landmark device 160 for calibration. The landmark device 160 is a fixed object of a known shape, size, color, and temperature. Once the landmark device 160 is known, the camera's 130 image sensor is represented by series of pixels at specified time. Based upon the where the landmark device 160 falls upon a pixel of the image sensor, the image processing can determine the depth of the image and eliminate the noise associated with the data, and thus provide calibration to the cameras 130 and lighting projectors 140 in the aircraft inspection system 100.

Figure 2:
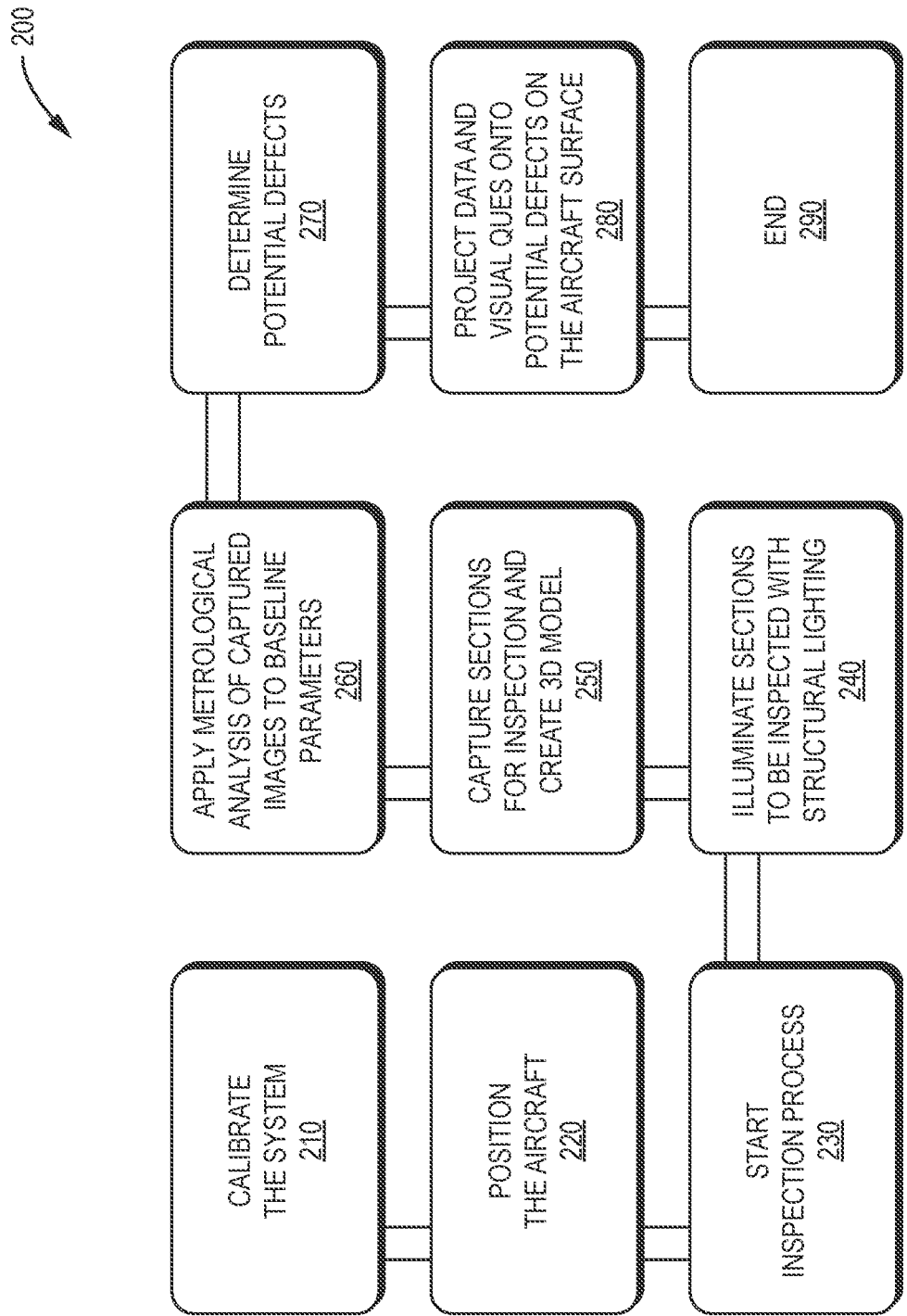
FIG. 2 illustrates a process flow diagram for the inspection process.

Turning now to FIG. 2, a process flow diagram 200 of the inspection process is presented. Beginning at step 210, the computer 150 launches the inspection process by adjusting the cameras 130 and lighting projectors 140 so that the system can be calibrated. The computer can scan the plurality of cameras 130 and lighting projectors 140 to verify that each of the components are operational. The system may use the landmark 160 to adjust a set point of the system 200. The system 200 can further consider the set point of the inspection frame 120 itself to calibrate and adjust for thermal expansion and contraction or re-positioning of the cameras or lighting.

At step 220, the aircraft 110 is positioned within the inspection frame 120. The aircraft 110 is parked in a fixed position while within the inspection frame 120. In an embodiment, the aircraft 110 is not powered on and has been parked long enough to adjust to the ambient temperature of the environment of the inspection frame. Noise and vibration from the aircraft 110 is minimized and eliminated while the aircraft is powered down.

At step 230, the inspection process begins. The computer 150 has calibrated the inspection frame 120 environment, the cameras 130 have been positioned, the lighting projectors have been positioned, and the system is ready to begin the process. The computer 150 has also loaded the baseline model of the aircraft 110 (also referred to herein as the "reference model") to be inspected. The baseline model includes the optimal surface specification of the particular aircraft 110 being inspected. The baseline model may be based upon specifications from the aircraft manufacture, computer aided drawings (CAD) of the aircraft manufacture, prior scans of the particular aircraft, and/or a combination of all three.

Figure 3:
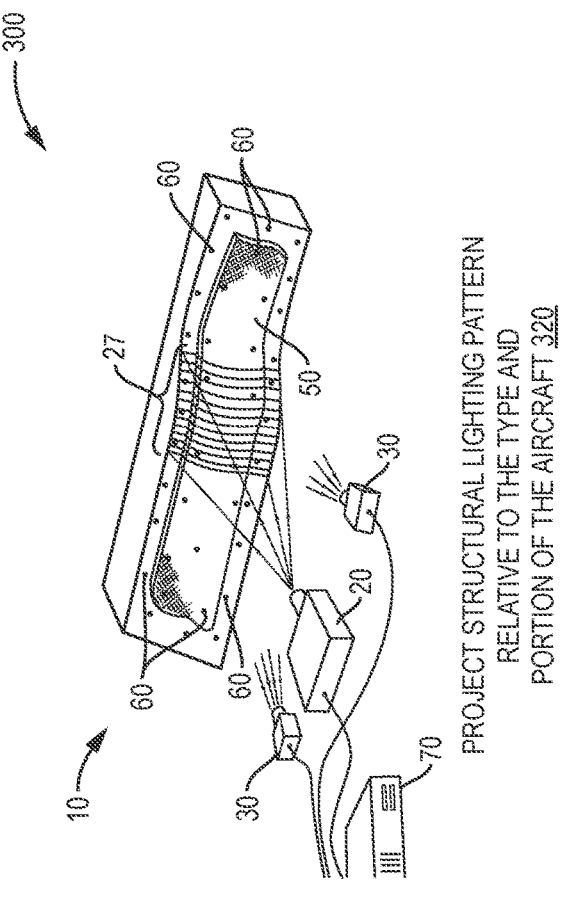
FIG. 3 illustrates a process flow for the lighting system.
Figure 3:
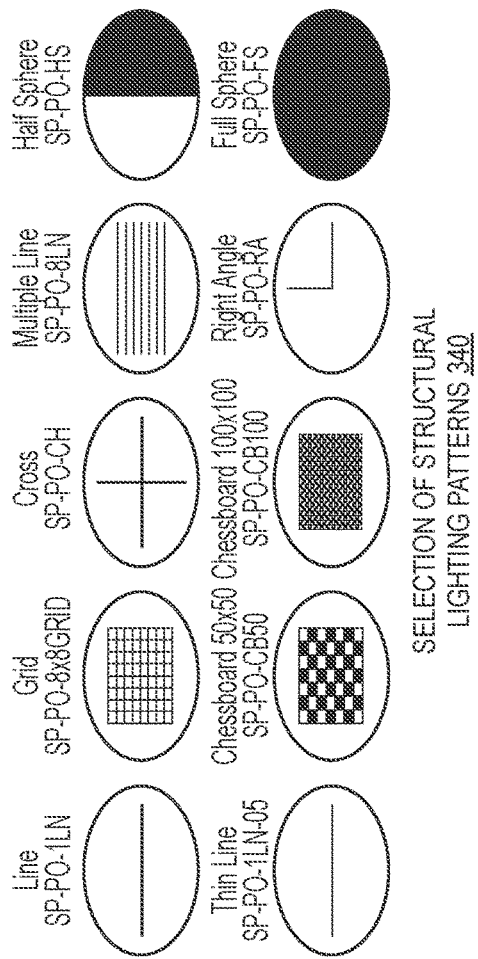
Figure 3:
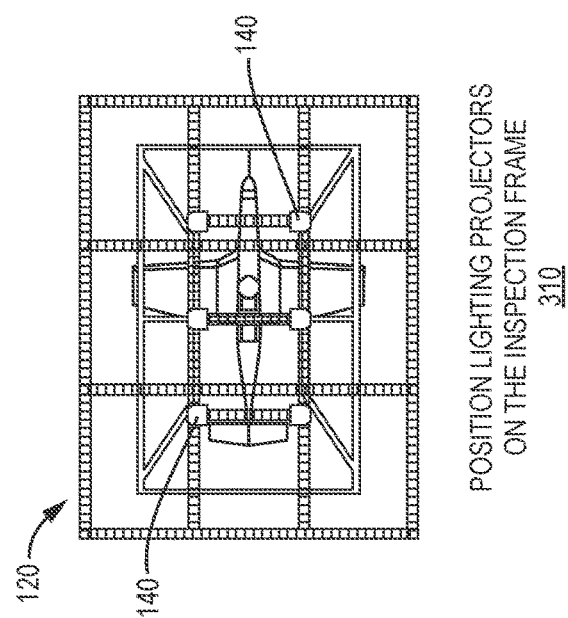
Figure 3:
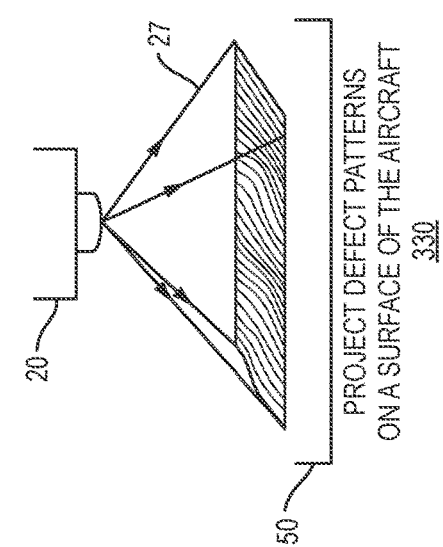

The lighting projectors 140 are activated and controlled by the computer 150 in step 240. The computer selects a structural light pattern for the lighting projectors 140 to project on the surface of the aircraft 110. As illustrated in FIG. 3, a structural light pattern 340 refers to the projection of light with a known shading pattern. The result is the projection of a known structural light pattern 340 on the captured scene reflected from the surface of the aircraft 110. The main purpose of structured light pattern 340 projection is to detect and measure the deformation of the expected structured light pattern 340 on the scene. Each lighting projector 140 is individually controlled by the computer 150, therefore, different structural light patterns can be projected on to different parts of the aircraft 110 based on the parameters for a particular portion of the aircraft 110. The structural lighting patterns 340 projected by the lighting projectors 140 may, for example, include a harmonic scan, a series of grid or fringe patterns, a time-shifted series of fringe, grid, color, or dot patterns, and/or other patterns of light. The structural lighting patterns can also be simple lines, grids, crosses, shapes, and other patterns as illustrated in FIG. 3. Each of the lighting projectors 140 have a unique identifier, such that the computer 150 is able to record which lighting projector 140 illuminated which portion of the aircraft 110 and the associated structural lighting pattern 340 that was projected on to that portion of the aircraft 110.

The cameras 130 begin capturing images of the structural lighting patterns 340 that have been projected on individual portions of the surface of the aircraft 110 by the lighting projectors 140. Each of the cameras 130 has a unique identifier, such that the computer 150 can control and record which camera within the inspection frame 120 captured images from which portion of the aircraft 110 and the associated structural lighting pattern 340 that was projected on to that portion of the aircraft 110 at step 250. Optionally, after step 250, the system may update the calibration of the system based on the captured images.

Once the images of the structural lighting patterns projected by the lighting projectors 140 on to the entire surface of the aircraft 110 have been captured by cameras 130, a three-dimensional model of the aircraft 110 is created. The three-dimensional model can be created without using stitching algorithms because the coordinates of each camera 130 is known within the inspection frame 120 relative to the aircraft 110.

Next at step 260 once the three-dimension model of the aircraft 110 has been created, or optionally, a three-dimensional model of a portion of the aircraft 110 has been created, the computer 150 can being a metrological analysis of the three-dimensional models. In an embodiment, the metrological analysis detects distortions in the captured images of the structured light patterns 340 that were projected on the surface of the aircraft 110. The distortions in the captured images of the structured light patterns 340 can represent defects on the aircraft 110. The system 200 compares the baseline model of the optimal surface specification of the particular aircraft being inspected, the 3D model of the aircraft 110 captured in step 250.

The sections of the aircraft 110 that are not congruent with the baseline model of the optimal surface specification of the aircraft 110 are determined to potentially have defects at step 270.

The computer 150 will direct the lighting projectors 140 to highlight and project data and patterns on to the surface of the aircraft 110 that is believed to have a potential defect. Those portions of the aircraft 110 that are believed to have defects can be visually inspected to verify and/or dismiss any potential damage or faults on the aircraft 110 surface at step 280.

Once the potential defects have been highlighted on the aircraft's 110 surface and a visual inspection has taken place, the system ends the inspection process at step 290.

Turing now to FIG. 3, the lighting projectors 140 are positioned along the inspection frame 120. Each lighting projector 140 has a unique identifier such a serial number and name related to its position on the inspection frame 120. The unique identifier allows the computer 150 to communicate and control individual lighting projectors 140 during the inspection process. The computer 150 positions individual lighting projector 140 based upon the type of aircraft being inspected. The position of an individual lighting projector 140 is based upon a coordinate system. The coordinate system determines the x, y, z plane of the lighting projector 140. The aircraft is represented along the "z" axis. The computer 150 positions the lighting projector 140 in the optimal position to illuminate individual aircraft 110 based upon the aircraft's 110 inspection parameters in step 310.

In step 320, the type of structural lighting pattern 27 projected on the surface 50 of the aircraft can vary depending on the type of aircraft 110 and/or the portion 10 of the aircraft 110 being inspected. The projector 20 in this step 320 projects a structural lighting, vertical wave pattern 27 on a surface of the aircraft having a plurality of rivets 60. Cameras 30 capture the structural lighting vertical wave pattern 27 against the rivets on a portion 10 of the aircraft 110. The computer 70 controls the projector 20 and the cameras 30 as they capture these images along a portion 10 of the aircraft's 110 surface 50. In this embodiment a vertical wave pattern 27 is used, however other structural lighting patterns 340 could have been used, as described above, based on the type of aircraft 110 and the portion of the aircraft 110 that is being inspected.

The structural lighting patterns 340 can be selected at step 2. A selection of structural lighting patterns 340 are presented. The system 300 can automatically select the structured lighting pattern 340 that is most relative to the aircraft 110.

At step 330 if defects are detected along a portion of the aircraft 110, the projector 20 will project an inspection pattern 27 on the aircraft's 110 surface to aide visual inspection of the surface 50 of the aircraft 110.

Figure 4:
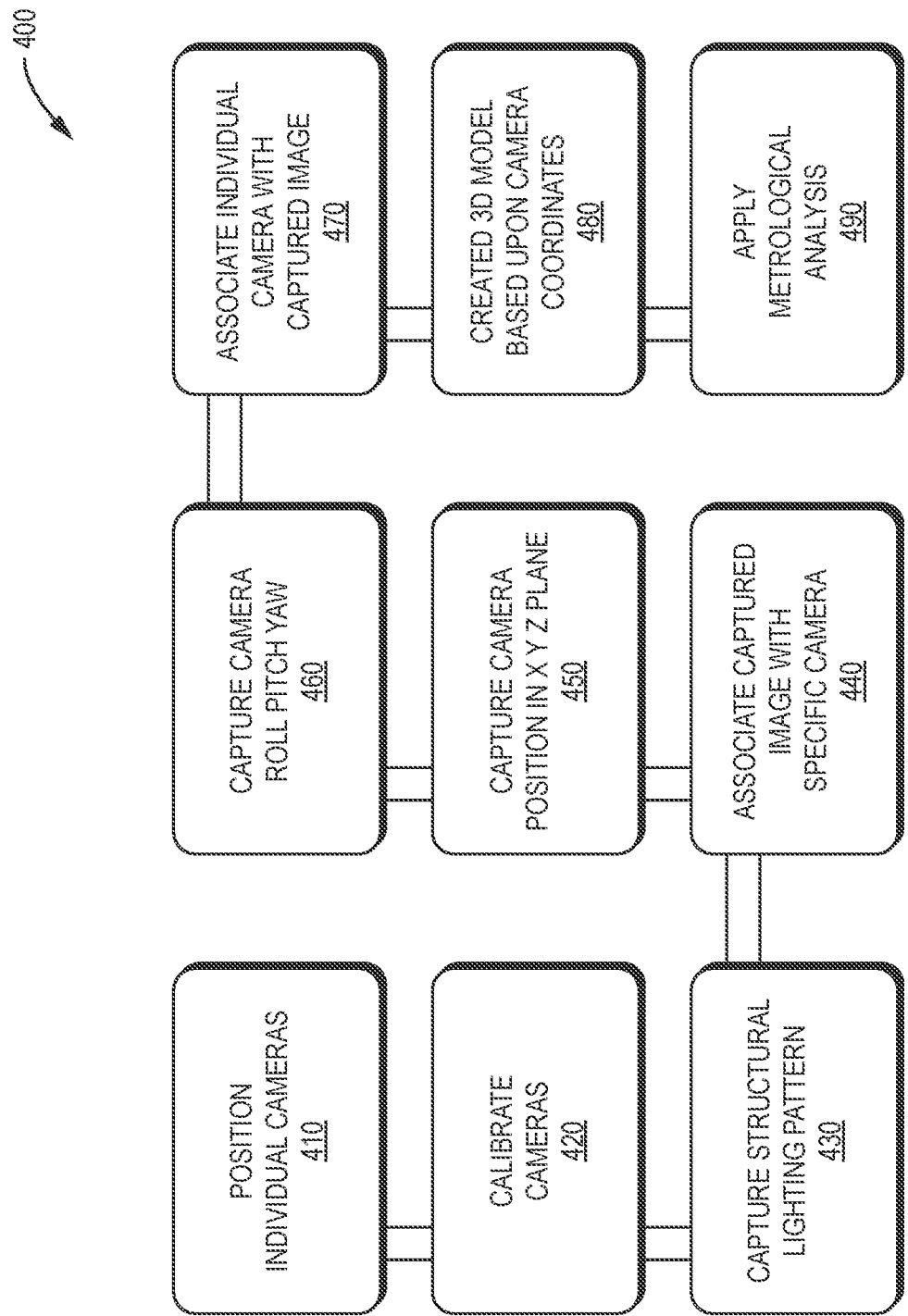
FIG. 4 illustrates a process flow diagram for the camera system.

Turning now to FIG. 4, a flow diagram 400 for positioning the cameras 130 is illustrated beginning at step 410 the inspection frame 120 includes a plurality of cameras 130 that are mounted throughout its structure in order to capture images from every angle of the aircraft 110 being inspected. The plurality of cameras 130 can capture images along the upper, lower, left, right, front and back of the aircraft 110 being inspected such that a three-dimensional (3D) map of the aircraft 110 being inspected is created.

The cameras 130 mounted on the inspection frame 120 can include a plurality of digital still and video cameras 130 with high resolution sensors. The cameras 130 can each be remotely and individually controlled by a computer 150. Each camera 130 has unique identifier such a serial number and name related to its position on the inspection frame 120. The unique identifier allows the computer 150 to communicate and control each individual camera 130 during the inspection process. The computer 150 positions each camera 130 based on the type of aircraft 110 being inspected at step 410.

Each camera 130 has its own unique set of parameters. In an embodiment, forty to sixty cameras 130 may be used to inspect the aircraft 110. Each camera 130 has a unique identifier (i.e. serial number), These unique identifiers allow the system to know which camera 130 captured which image and its position on the inspection frame 120 relative to the aircraft 110. Furthermore, the unique identifier further associates parameters associated with the camera. 130 such as the distortion of the lens of a particular camera. This can be represented by a polynomial centered at the center of the lens and curvature of the lens out to the edge of the lens.

Each camera 130 may, for example, be associated with one or a plurality of corresponding intrinsic parameters. The intrinsic parameters of different ones of the cameras 130 may differ from each other. Such intrinsic parameters may include, for example, any one or more of the following, in any combination:

A serial number and/or or other data that uniquely identifies the camera.

A type (e.g., model number) of the camera. The type of multiple ones of the cameras 130 may be the same as or different than each other, in any combination.

A license value, which may be used to determine whether the camera has been licensed into the system.

One or more parameters of the lens of the camera, such as any one or more of the following, in any combination:
  A version of the lens.
  K1, K2, and K3 values, which correspond to aspects of the lens distortion model.
  P1 and P2 values, which correspond to aspects of the lens distortion model.

One or more parameters of the interior of the camera, such as any one or more of the following, in any combination:
  A width of images generated by the camera, which may, for example, be measured in pixels.

A height of images generated by the camera, which may, for example, be measured in pixels.

The format sizes of images corresponding to the camera imaging sensor, e.g., in the X and Y dimensions of the imaging sensor. This may be calculated, for example, by multiplying the imaging sensor number of pixels by the size of each pixel.

A focal length of the camera, which may, for example, be measured in

A factory focal length of the camera, which may, for example, be measured in millimeters.

One or more principal points of the camera, e.g., in the X and Y dimensions.

A particular example of a set of internal camera parameters is shown below in Table 1. The particular parameters and parameter values shown in Table 1 are merely examples and do not constitute limitations of the present invention:

TABLE 1

[id]
serialNumber=U3-380xCP-M-1409f494
type=U3-380xCP-M
license=7369
[lens]
version=1
k1=0.0002
k2=−3.62e−06
k3=0
p1=−2.531e−05
p2=8.8909e−06
[interior]
widthPixels=5472
heightPixels=3672
formatSizeMMX=13.13
formatSizeMMY=8.8
focalLengthMM=16.05
factoryFocalLengthMM=16
principlePointMMX=6.52
principlePointMMY=4.26

Each camera 130 may, for example, be associated with one or a plurality of corresponding extrinsic parameters. The extrinsic parameters of different ones of the cameras 130 may differ from each other. Such extrinsic parameters may include, for example, any one or more of the following, in any combination:

A serial number and/or or other data that uniquely identifies the camera. This serial number may be user-defined, and may be different than the serial number of the camera within the camera's intrinsic parameters.

A minimum Z distance and maximum Z distance corresponding to the depth at which 3D data is allowed as a distance from the camera. Any 3D data outside of this range may cropped.

A name of the camera, which may, for example, be a text string or other unique identifier of the camera. The name may, for example, be represented in a human-readable form to facilitate identification of the camera by human operators. For example, when pairs of left and right cameras are used, the character "L" may be used in names of left cameras, and the character "R" may be used in names of right cameras, in order to distinguish left cameras from right cameras.

A serial number of the camera, which may, for example, be the same as the serial number of the camera identified in the camera's intrinsic parameters.

Coordinates of the camera in three-dimensional space, e.g., any two or more of X, Y, and Z coordinates of the camera.

Yaw (omega), Pitch (phi), and Kappa (roll) of the camera.

A particular example of a set of external camera parameters is shown below in Table 2 for a pair of left and right cameras. The particular parameters and parameter values shown in Table 2 are merely examples and do not constitute limitations of the present invention:

TABLE 2

[common]
serial=pAircraftScanner
minZ=2000
maxZ=10000
[c1LTDL-camera]
name=c1LTDL
serialNumber=U3-380xCP-M-1409f497
x=0
y=0
z=0
omega=0
phi=0
kappa=0
[c1LTDR-camera]
name=c1LTDR
serialNumber=U3-380xCP-M-1409f49f
x=1623.41
y=31.79
z=−820.24
omega=−0.82
phi=18.66
kappa=0.47

As implied by the above, the cameras 130 may include one or more pairs of cameras, where each of the pairs includes a left camera and a right camera. As is well-known in the art of metrology, within such a pair of cameras, the left camera and the right camera may be positioned such that the left camera and the right camera image the same, or substantially the same, region of the aircraft's surface, but from different perspectives. As is also well-known in the art of metrology, the system 100 may use such paired stereoscopic images to facilitate in performing various functions disclosed herein, such as generating the captured model of the aircraft 110.

As described elsewhere herein, the system 100 may use the intrinsic parameters and/or extrinsic parameters of the cameras 130 to capture and generate a plurality of images of the aircraft 110 that are represented in a single coordinate system. Because the plurality of images are represented in that single coordinate system, the system 100 may generate the captured model of the aircraft 110 based on the plurality of images without stitching the plurality of images together, i.e., without using traditional stitching algorithms which require that differing coordinate systems of different images be reconciled with each other in order to combine those images into a combined image or model.

For each of the cameras 130, the system may knows where the camera 130 lens sits relative to the imaging sensor. The image sensor is represented by pixels. The pixel size is specified by the image sensor specification. This allows the size of the sensor to be known. Information about the lens relative to the image sensor also allows the focal length of the lens to be known. This provides information as to how divergent an image is. The system then picks a focal length to cover the area that is collected by the camera 130. The principle point of the lens captures the shift of the camera 130 lens relative to the sensor.

In step 420, each camera 130 is calibrated. The system may use a landmark 160, as discussed above, to set the calibration of each camera 130 system. The landmark 160 may have a baseline color, temperature, and position to allow for calibration of each camera 130.

At step 430 the cameras 130 being to capture structural lighting patterns 340 associated with the aircraft 110 being inspected.

Further at step 440, metadata associated with the camera's 130 unique identifier and position within the coordinate system are captured along with the image. The cameras 130 physical orientation relative to the inspection frame 120 is also captured. This allows a captured image to be associated with a particular camera 130 in 3D space.

In still a further embodiment at step 450, the camera 130 is associated with a coordinate system. The coordinate system determines the x, y, z plane of the camera 130. The aircraft is represented along the "z" axis, Each camera 130 is represented by a camera 130 name associated with its position along the inspection frame 120. The camera 130 name is associated with its position along the x, y, z, planes. A four-by-four transformation matrix may be associated with where the camera 130 sits in space. This coordinate system allows the images captured by the camera 130 system to be represented by the same coordinate system as the cameras 130 which took the image, so that they can be combined together without having to use an image stitching algorithm to combine the images.

Further in step 460, system has recorded each camera's 130 roll, pitch, and yaw position relative to Camera 1, the inspection frame 120, or relative to the aircraft's 110 surface. In an embodiment, the camera's 130 should be 45-90 degrees relative to the aircraft surface, so that it is substantially orthogonal to the aircraft surface.

At step 470, each individual camera 130, within the 3D space is associated with the image of the aircraft 110 it captured within the 3D space. This association includes the metadata regarding the camera's position with the x, y, z axis as well as its roll, pitch, and yaw within the 3D space.

Given the trans-dimensional coordinates provided by the metadata that is associated with each image captured by the cameras 130, a 3D image model of the aircraft 110 can be created for analysis in step 480.

Once the 3D image model of the aircraft has been created, a metrological analysis of the aircraft 110 can be processed. As explained above, the metrological analysis compares the 3D image model of the aircraft 110 to a baseline model of the aircraft 110 to determine if there are defects or deviations in the 3D image model in step 490.

Figure 5:
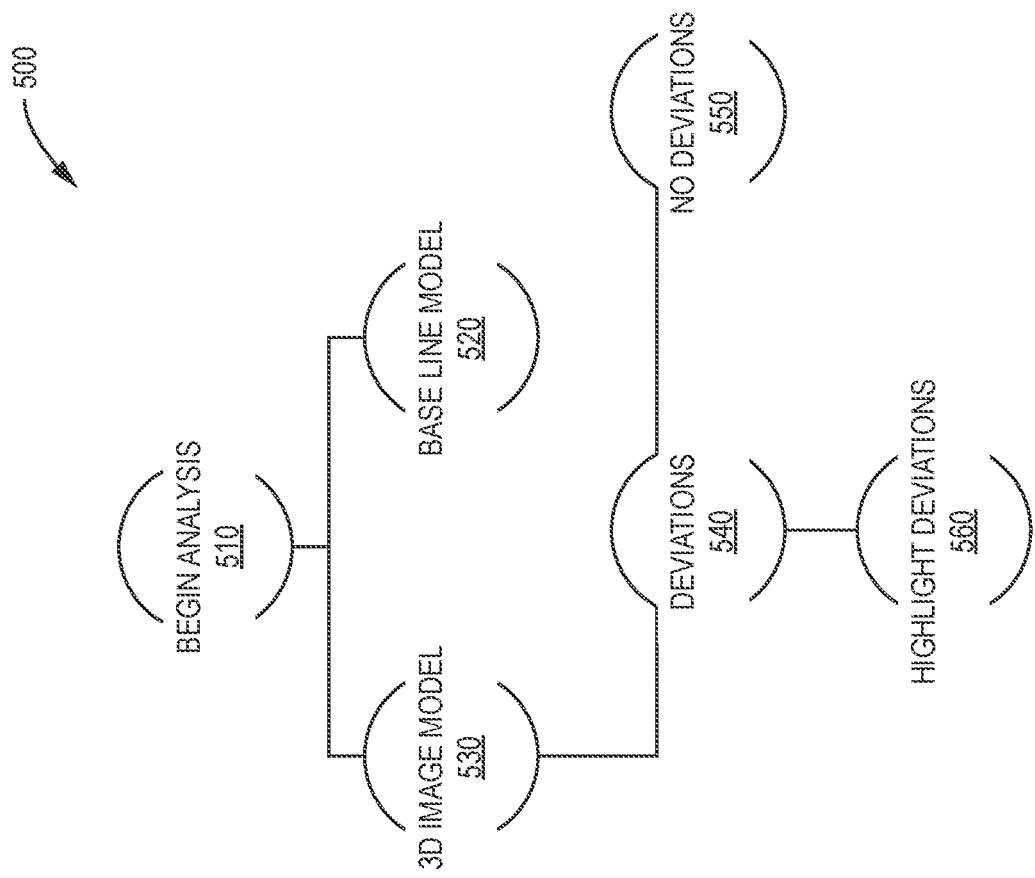
FIG. 5 illustrates an image processing flow diagram applying metrological analysis to the captured images.

Turning now to FIG. 5, a process flow diagram 500 of the metrological analysis is presented. The process begins at step 510 wherein, based upon the type of aircraft 110 being inspected, a baseline model 520 of the aircraft 110 is uploaded to the system at step 520. The baseline model 520 includes the optimal performance characteristics and fault tolerances of the aircraft 110.

At step 530, the 3D image model of the aircraft 110 captured by the cameras 130 is assembled in the system. The system using metrological analysis to compare the 3D image model 530 to the baseline model 520 so that deviations can be detected.

At step 540 the comparison is performed to determine if there are deviations between the 3D image model 530 and baseline model 520. If deviations are found, output representing some or all such deviations may be generated. For example, an image of some or all such deviations may be generated, such as in the form of a "heatmap" in which positive deviations (e.g., regions of the captured model that are higher than the corresponding regions of the baseline model) are shown in the red spectrum, and in which negative deviations (e.g., regions of the captured model that are lower than the corresponding regions of the baseline model) are shown in the blue spectrum. Such an image may, for example, be saved in a file and/or output to the user on an output device, such as by displaying the image on a display monitor. Multiple such images may be generated and displayed, each for a different region of the aircraft's surface. If no deviations are found, the system ends at step 550.

Figure 6:
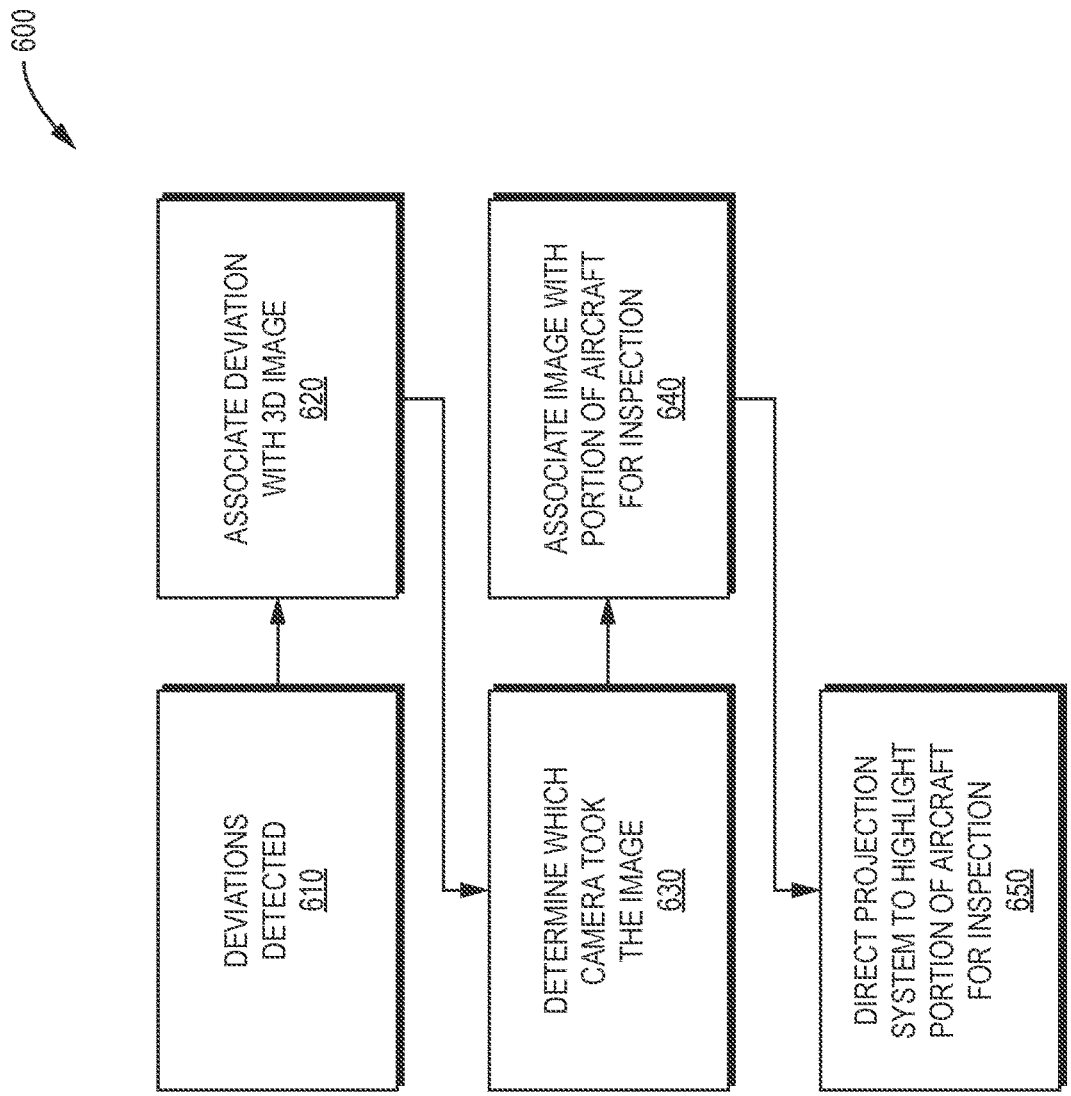
FIG. 6 illustrates a flow diagram for projecting data and patterns on the surface of the aircraft to highlight defects.

Turing now to FIGS. 5 and 6, in an embodiment of the invention, once a deviation 540 has been detected in the 3D image model 530, the system 500 moves to highlight the deviation 560 on the associated surface of the aircraft 110. This can be accomplished via the process 600 for highlighting deviations.

At step 610, once deviations have been detected between the 3D image model 530 and a baseline model 520, the systems being the process of determining where the deviation is on the physical surface of the aircraft 110.

At step 620, the system associates the deviation with an associated 3D image taken of the aircraft 110. The system uses the metadata associated with the camera's 130 unique identifier along with the position of the camera 130 relative to the aircraft 110 when the image was taken.

At step 630, the system uses this metadata to determine which camera 130 took the associated image.

Based upon the camera's 130 position in 3D space at the time the image was taken, at step 640, the system associates the image with the portion of the aircraft 110 that was determined to have the defect.

At step 650, having determined where the defect is on the physical surface of the aircraft 110, the system directs the computer 150 to activate the projector(s) 140 that is associated with the area of the aircraft 110 that has the defect. The computer 150 can direct the projector 140 to project an inspection image on the surface of the aircraft 110 that provides data and patterns that highlight the defect so that it can be visually inspected.

Figure 7:
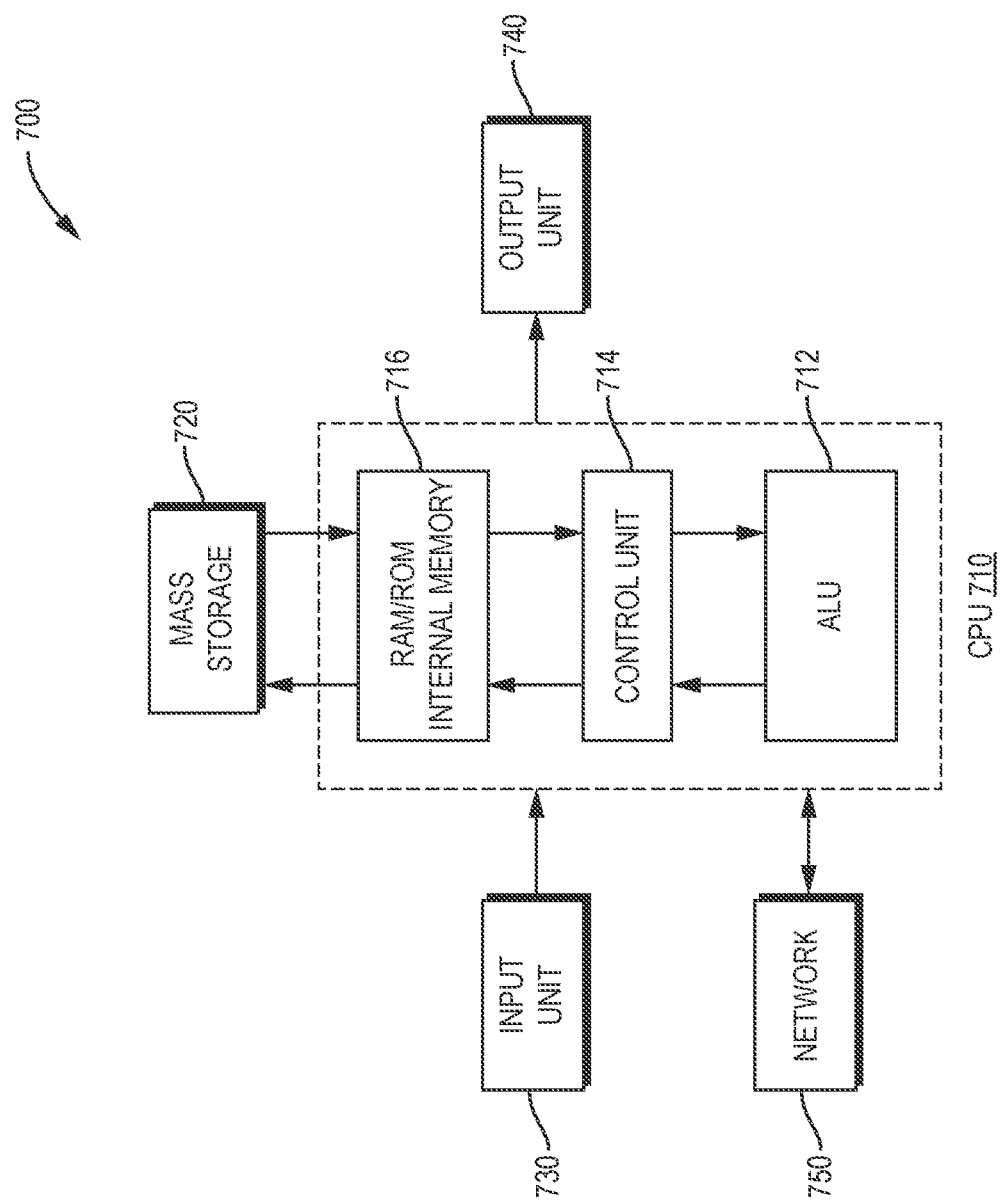
FIG. 7 illustrates a general computing platform.

FIG. 7 illustrates a general-purpose computer 700 connected to a network 750. Indeed, in embodiments, the general-purpose computer 700 may also be a server. The general-purpose computer 700 comprises a central processing using 710 in communication with a mass storage device 720. The general-purpose computer 700 receives inputs from an input unit 730. The general-purpose computer 700 produces output via an output unit 740. The general-purpose computer 700 is controlled using a microprocessor or central processing unit 710. The general processing unit 710 is comprised of an arithmetic logic unit 712, a control unit 714, and an internal memory 716. More generally, the general-purpose computer 700 is a data processing apparatus of the disclosure. Typically, the general-purpose computer 700 according to embodiments of the disclosure is a computer device such as a personal computer or a terminal connected to a server. Indeed, in embodiments, the general-purpose computer 700 may also be a server. Accordingly, in so far as embodiments of the disclosure have been implemented, at least in part, by a software-controlled general-purpose computer 700, it will be appreciated that a non-transitory machine-readable medium or memory 716 carrying such software, such as an optical disk, a magnetic disk, semiconductor memory or the like, is also considered to represent an embodiment of the present disclosure.

The term "substantially the entire exterior surface of an aircraft" (or other vehicle or object) refers to an amount of the exterior surface of an aircraft that does not differ from the entire exterior surface of the aircraft by an amount, or to a degree, that affects the ability of embodiments of the present invention to detect material defects in the entire exterior surface of the aircraft. Examples of substantially the entire exterior surface of an aircraft include, for example, at least 80%, at least 90%, at least 95%, at least 96%, at least 97%, at least 98%, at least 99%, at least 99.5%, and at least 99.9% of the entire exterior surface of the aircraft.

In some embodiments, the techniques described herein relate to a system for examination of physical structures, wherein the system includes: an inspection frame, the inspection frame capable of enveloping a physical device, the inspection frame having one or more lighting systems mounted on to the inspection frame; the inspection frame having one or more camera systems mounted on to the inspection frame; a computing device having an image processing system for controlling the lighting systems and camera systems mounted on to the inspection frame; the computing device controlling and adjusting the lighting systems and wherein the lighting system projects structured lighting patterns on the physical device and wherein the camera systems collect one or more images of the structured lighting patterns projected on the physical device; the computing device storing the one or more images collected by the camera systems; the image processing system for analyzing, assembling, and processing the stored images captured by the computing device; the image processing system assembles the stored images to create a complete picture of the physical device for metrological analysis; and wherein the metrological analysis detects defects on the physical device; the lighting system in communication with the computing device and image processing system, projects data and patterns on to the surface of the physical device to pinpoint its defects.

In some embodiments, the techniques described herein relate to a method of aggregating images to detect defects, wherein the method includes: positioning projectors to illuminate an entire aircraft surface; positioning cameras to capture images of the entire aircraft surface; capturing images of the structured light reflected from the aircraft surface analyzing the captured images of structured light to generate output representing at least one defect in the surface of the aircraft, including: combining the captured images of structured light to generate a combined image; and analyzing the combined image to detect defects.

Analyzing the combined image to detect defects may include applying different analyses to images associated with different parts of the aircraft. For example, the method may apply a first analysis method to a first image associated with a first part of the aircraft, and apply a second analysis method to a second image associated with a second part of the aircraft, wherein the first analysis method differs from the second analysis method. The method may select the first analysis method based on the first part of the aircraft. For example, the method may determine that the first analysis method is associated with the first part of the aircraft, and select the first analysis method based on that association. Similarly, the method may select the second analysis method based on the second part of the aircraft. For example, the method may determine that the second analysis method is associated with the second part of the aircraft, and select the second analysis method based on that association.

Similarly, analyzing the combined image to detect defects may include applying different fault tolerances to images associated with different parts of the aircraft. For example, the method may apply a first fault tolerance to a first image associated with a first part of the aircraft, and apply a second fault, tolerance to a second image associated with a second part of the aircraft, wherein the first fault tolerance differs from the second fault tolerance. The method may select the first fault tolerance based on the first part of the aircraft. For example, the method may determine that the first fault tolerance is associated with the first part of the aircraft, and select the first fault tolerance based on that association. Similarly, the method may select the second fault, tolerance based on the second part of the aircraft. For example, the method may determine that the second fault tolerance is associated with the second part of the aircraft, and select the second fault tolerance based on that association.

In some embodiments, the techniques described herein relate to a method for inspecting aircraft, wherein the method includes: enveloping the aircraft within an inspection frame, mounting one or more lighting systems on to the inspection frame; mounting one or more camera systems on to the inspection frame; controlling the lighting systems, camera systems, and projection systems mounted on to the inspection frame with a computing device; adjusting the lighting systems and projecting structured lighting patterns on to the surface of the aircraft, and wherein the camera systems capture one or more images of the structured lighting patterns projected on the surface of the aircraft; storing the one or more images captured by the camera systems within the computing device; analyzing, assembling, and processing the stored images within an image processing system that is executing on the computing device, wherein; the image processing system assembles the stored images to create a complete picture of the aircraft for metrological analysis; and wherein the metrological analysis applies an inspection analysis to identify defects on the surface of the aircraft; projecting data and patterns on the surface of the aircraft to visually highlight defects on the surface of the aircraft.

The inspection analysis may apply different criteria to different parts of the aircraft. For example, the inspection analysis may apply different criteria to images associated with different parts of the aircraft. For example, the method may apply a first criterion to a first image associated with a first part of the aircraft, and apply a second criterion to a second image associated with a second part of the aircraft, wherein the first criterion differs from the second criterion. The method may select the first criterion based on the first part of the aircraft. For example, the method may determine that the first criterion is associated with the first part of the aircraft, and select the first criterion based on that association. Similarly, the method may select the second criterion based on the second part of the aircraft. For example, the method may determine that the second criterion is associated with the second part of the aircraft, and select the second criterion based on that association.

The inspection analysis may apply different fault tolerances to different parts of the aircraft. For example, the inspection analysis may apply a first fault tolerance to a first image associated with a first part of the aircraft, and apply a second fault tolerance to a second image associated with a second part of the aircraft, wherein the first fault tolerance differs from the second fault tolerance. The inspection analysis may select the first fault tolerance based on the first part of the aircraft. For example, the inspection analysis may determine that the first fault tolerance is associated with the first part of the aircraft, and select the first fault tolerance based on that association. Similarly, the inspection analysis may select the second fault tolerance based on the second part of the aircraft. For example, the inspection analysis may determine that the second fault tolerance is associated with the second part of the aircraft, and select the second fault tolerance based on that association.

Analyzing, assembling, and processing the stored images may include, for each of the stored images, identifying a corresponding region of the surface of the aircraft that is associated with that stored image.

Projecting data and patterns on the surface of the aircraft may including projecting data and patterns on corresponding regions of the aircraft having those defects.

Analyzing, assembling, and processing the stored images may include, for each of the stored images, identifying an analysis technique and/or fault tolerance associated with a corresponding region of the stored image. Analyzing, assembling, and processing the stored images may further include applying the identified analysis technique and/or fault tolerance to the stored image associated with the corresponding region of the aircraft.

The method may further include flagging detected defects on the surface of the aircraft for further inspection.

Controlling the lighting systems, camera systems, and projection systems mounted on to the inspection frame with the computing device may include using the computing device to adjust the lighting, camera, and projectors for optimal image capture.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Any of the functions disclosed herein may be implemented using means for performing those functions. Such means include, but are not limited to, any of the components disclosed herein, such as the computer-related components described below.

The techniques described above may be implemented, for example, in hardware, one or more computer programs tangibly stored on one or more computer-readable media, firmware, or any combination thereof. The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, embodiments of the present invention use a plurality of projectors and cameras to capture image data representing substantially the entire surface of an aircraft and then to create a three-dimension map of substantially the entire surface of the aircraft. Such a function cannot be performed mentally or manually by a human.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

The terms "A or B," "at least one of A or/and B," "at least one of A and B," "at least one of A or B," or "one or more of A or/and B" used in the various embodiments of the present disclosure include any and all combinations of words enumerated with it. For example, "A or B," "at least one of A and B" or "at least one of A or B" may mean: (1) including at least one A, (2) including at least one B, (3) including either A or B, or (4) including both at least one A and at least one B.

What is claimed is:

1. A system for examination of aircraft, wherein the system comprises:
    an inspection frame, the inspection frame capable of enveloping an aircraft,
    the inspection frame having lighting systems mounted on to the inspection frame;
    the inspection frame having one or more camera systems mounted on to the inspection frame;
    a computing device having an image processing system for controlling the lighting systems and camera systems mounted on to the inspection frame;
    the computing device controlling and adjusting the lighting systems and wherein the lighting system projects structured lighting patterns on the physical device and wherein the camera systems collect one or more images of the structured lighting patterns projected on the physical device;
    the computing device storing the images collected by the camera systems;
    the image processing system for analyzing, assembling, and processing the stored images captured by the computing device;
    the image processing system represents the images in a single coordinate system using respective coordinate transformations for each of the camera systems and assembling the stored images to create a complete picture of the aircraft for metrological analysis; and wherein the metrological analysis detects defects on the aircraft;
    the lighting system in communication with the computing device and image processing system, projects data and patterns on to the surface of the physical device aircraft to pinpoint the identified defects,
    wherein analyzing, assembling, and processing the stored images comprises, for each of the stored images, identifying a corresponding region of the surface of the aircraft that is associated with that stored image.

2. A method of aggregating images to detect defects, wherein the method comprises:
    positioning projectors to illuminate an entire aircraft surface of the aircraft;
    positioning cameras to capture images of the entire aircraft surface;
    capturing images of the structured light reflected from the aircraft surface
    analyzing the captured images of structured light to generate output representing at least one defect in the surface of the aircraft, comprising:
        combining the captured images of structured light to generate a combined image; and
        analyzing the combined image to detect defects.

3. The method of claim 2, wherein analyzing the combined image to detect defects comprises applying different analyses to images associated with different parts of the aircraft.

4. The method of claim 3, wherein applying the different analyses to images associated with different parts of the aircraft comprises:
    applying a first analysis method to a first image associated with a first part of the aircraft; and
    applying a second analysis method to a second image associated with a second part of the aircraft;
    wherein the first analysis method differs from the second analysis method.

5. The method of claim 3, wherein applying the different analyses comprises applying different fault tolerances to different parts of the aircraft.

6. A method for inspecting aircraft, wherein the method comprises:
    enveloping the aircraft within an inspection frame,
    mounting one or more lighting systems on to the inspection frame;
    mounting camera systems on to the inspection frame;
    controlling the lighting systems, camera systems, and projection systems mounted on to the inspection frame with a computing device;
    adjusting the lighting systems and projecting structured lighting patterns on to the surface of the aircraft and wherein the camera systems capture images of the structured lighting patterns projected on the surface of the aircraft;
    storing the images captured by the camera systems within the computing device;
    analyzing, assembling, and processing the stored images within an image processing system that is executing on the computing device, wherein; the image processing system represents the images in a single coordinate system using respective coordinate transformations for each of the camera systems and assembling the stored images in order to create a complete picture of the aircraft for metrological analysis; and
    wherein the metrological analysis applies an inspection analysis to identify defects on the surface of the aircraft;
    projecting data and patterns on the surface of the aircraft to visually highlight the identified defects on the surface of the aircraft,
    wherein analyzing, assembling, and processing the stored images comprises, for each of the stored images, identifying a corresponding region of the surface of the aircraft that is associated with that stored image.

7. The method according to claim 6, wherein the inspection analysis applies different criteria to different parts of the aircraft.

8. The method according to claim 6, wherein the inspection analysis applies different fault tolerances to different parts of the aircraft.

9. The method according to claim 6, wherein projecting data and patterns on the surface of the aircraft comprises projecting data and patterns on corresponding regions of the aircraft having those defects.

10. The method according to claim 6, wherein analyzing, assembling, and processing the stored images comprises, for each of the stored images, identifying an analysis technique and/or fault tolerance associated with a corresponding region of the stored image.

11. The method according claim 10, wherein analyzing, assembling, and processing the stored images further comprises applying the identified analysis technique and/or fault tolerance to the stored image associated with the corresponding region of the aircraft.

12. The method according claim 6, further comprising flagging detected defects on the surface of the aircraft for further inspection.

13. The method according to claim 6, wherein controlling the lighting systems, camera systems, and projection systems mounted on to the inspection frame with the computing device comprises using the computing device to adjust the lighting, camera, and projectors for improved image capture.

\* \* \* \* \*